United States Patent
Fluch

(10) Patent No.: US 12,319,043 B2
(45) Date of Patent: Jun. 3, 2025

(54) METHOD FOR CONNECTING SHEET METAL PARTS IN ORDER TO FORM LAMINATION STACKS

(71) Applicant: voestalpine Stahl GmbH, Linz (AT)

(72) Inventor: Ronald Fluch, Linz (AT)

(73) Assignee: voestalpine Stahl GmbH, Linz (AT)

( * ) Notice: Subject to any disclaimer, the term of this patent is extended or adjusted under 35 U.S.C. 154(b) by 98 days.

(21) Appl. No.: 18/252,689

(22) PCT Filed: Nov. 11, 2021

(86) PCT No.: PCT/EP2021/081443
§ 371 (c)(1),
(2) Date: May 11, 2023

(87) PCT Pub. No.: WO2022/101369
PCT Pub. Date: May 19, 2022

(65) Prior Publication Data
US 2023/0415469 A1  Dec. 28, 2023

(30) Foreign Application Priority Data
Nov. 11, 2020 (EP) ..................................... 20207047

(51) Int. Cl.
 B32B 38/00 (2006.01)
 B32B 7/06 (2019.01)
 (Continued)

(52) U.S. Cl.
 CPC ............ *B32B 37/1207* (2013.01); *B32B 7/06* (2013.01); *B32B 7/12* (2013.01); *B32B 15/043* (2013.01); *B32B 15/18* (2013.01); *B32B 38/0004* (2013.01); *B32B 2255/06* (2013.01); *B32B 2255/26* (2013.01); *B32B 2255/28* (2013.01);
 (Continued)

(58) Field of Classification Search
 CPC ......... B32B 37/1207; B32B 7/06; B32B 7/12; B32B 15/043; B32B 15/18; B32B 38/0004; B32B 2255/06; B32B 2255/26; B32B 2255/28; B32B 2307/748; B32B 2309/02;
 (Continued)

(56) References Cited

U.S. PATENT DOCUMENTS

| 9,669,611 B2* | 6/2017 | Peruzzi ............... B32B 38/0004 |
| 10,391,741 B2* | 8/2019 | Fluch ........................ H01F 3/02 |
| 2022/0241837 A1* | 8/2022 | Fluch .................... B21D 43/22 |

FOREIGN PATENT DOCUMENTS

| DE | 102018122047 A1 | 3/2020 |
| EP | 2883692 B1 | 6/2015 |

(Continued)

OTHER PUBLICATIONS

International Search Report and Written Opinion of PCT Application No. PCT/EP2021081443, dated Feb. 7, 2022; 14 pages.

*Primary Examiner* — George R Koch
*Assistant Examiner* — Christopher C Caillouet

(57) ABSTRACT

A method and device for connecting sheet metal parts in order to form lamination stacks. In order to reproducibly manufacture geometrically accurate lamination stacks, it is proposed for the first and/or second coating to be provided with a separating layer, which contains a reaction accelerator for the adhesive of the first coating and contains a release agent in order to thus facilitate the division of the sheet metal parts into lamination stacks.

19 Claims, 3 Drawing Sheets

(51) Int. Cl.
  *B32B 7/12*   (2006.01)
  *B32B 15/04*  (2006.01)
  *B32B 15/18*  (2006.01)
  *B32B 37/12*  (2006.01)

(52) U.S. Cl.
  CPC ..... *B32B 2307/748* (2013.01); *B32B 2309/02* (2013.01); *B32B 2311/30* (2013.01)

(58) Field of Classification Search
  CPC ................ B32B 2311/30; B32B 37/12; B32B 2307/732; B32B 15/011; H02K 15/02
  See application file for complete search history.

(56) References Cited

FOREIGN PATENT DOCUMENTS

| | | |
|---|---|---|
| EP | 3316457 A1 | 10/2016 |
| EP | 2826136 B1 | 12/2019 |
| EP | 3353241 B1 | 2/2021 |
| EP | 2931520 B1 | 1/2024 |
| WO | 2014089593 A1 | 6/2014 |
| WO | 2019201788 A1 | 10/2019 |

\* cited by examiner

METHOD FOR CONNECTING SHEET METAL PARTS IN ORDER TO FORM LAMINATION STACKS

TECHNICAL FIELD

The invention relates to a method for connecting sheet metal parts in order to form lamination stacks, in which an electrical steel strip or sheet is prepared, which has a first coating on its first flat side and a second coating on its second flat side opposite from the first, wherein the first coating contains a preferably thermally activatable adhesive and is free of reaction accelerators and wherein the second coating contains a reaction accelerator for the adhesive of the first coating, sheet metal parts are separated, more particularly cut off, from the electrical steel strip or sheet, the separated sheet metal parts are stacked onto one another in such a way that between each pair of successive sheet metal parts, the first coating faces the second coating, the stacked sheet metal parts are baked onto one another through activation of the adhesive of the first coating, and in another step, are divided into lamination stacks.

PRIOR ART

In order to manufacture lamination stacks it is known, for example, to separate sheet metal parts from a backlack-coated electrical steel strip or sheet, stack them, bake them, and then divide the baked sheet metal parts into lamination stacks.

Various types of electrical steel strips are used for this purpose—for example also an electrical steel strip coated on both sides, which has a first coating on its first flat side and a second coating on its second flat side opposite from the first. The first coating contains a preferably thermally activatable adhesive and is free of reaction accelerators. The second coating contains the reaction accelerator for the adhesive of the first coating (WO2019/201788A1). When the cut sheet metal parts are stacked, the first coating faces the second coating, wherein the reaction accelerator of the second coating accelerates the curing of the adhesive of the first coating.

A durable bond between the sheet metal parts is thus produced; this can, however, make the division or separation into lamination stacks more difficult.

To facilitate the division of the baked sheet metal parts into lamination stacks, it is known from WO2014089593A1 to use a release agent, which is applied to a particular section of the electrical steel strip or also to the separated sheet metal part depending on the desired lamination stack height. These release agents can disadvantageously delay the curing of the adhesive that contacts them. Among other things, there is thus a risk of the adhesive flowing out during the baking of the components—more particularly if they are baked while under pressure. There is thus a negative impact for example on the geometrical accuracy of the lamination stacks and thus the reproducibility of the method.

SUMMARY OF THE INVENTION

The object of the invention, therefore, is to improve the reproducibility of a method for connecting sheet metal parts in order to form lamination stacks of the type explained at the beginning.

If a separating layer, which contains a reaction accelerator for the adhesive of the first coating and a release agent, is provided on the first and/or second coating, then it is possible with the aid of the release agent to facilitate the division of the sheet metal parts into lamination stacks.

This is true because for example the release agent reduces the adhesion between the first and second coating. In addition, the reaction accelerator of the separating layer results in an increase in the melting viscosity of the adhesive of the first coating, which also impedes the wetting of the adhesive on the surface of the second coating.

In addition, the reaction accelerator of the separating layer can prevent an insufficient curing reaction of the adhesive of the first coating from occurring during the baking due to the presence of the release agent between the first and second coatings. There is thus no danger of the first coating escaping or being squeezed out during the baking of the sheet metal parts, which would have a negative impact on the geometrical accuracy of the lamination stacks, among other things.

According to the invention, it is thus possible to produce geometrically accurate lamination stacks with greater reproducibility.

In a simple way from a process standpoint, the separating layer on the first and/or second coating of the electrical steel strip can be provided in selected areas.

It is also possible to provide this method step in a simple way in that the separating layer on the first and/or second coating of individual sheet metal parts is provided in selected areas or over their entire area before they are stacked. It is also conceivable for the separating layer to be provided in selected areas of the first and/or second coating of the electrical steel strip or sheet and also for it to be provided on the first and/or second coating of individual sheet metal parts in selected areas or over the entire area thereof before they are stacked on one another.

Preferably, the release agent is adhesion-disrupting, which significantly reduces or prevents the adhesion between the first and second coatings. This occurs, for example, in that the release agent prevents the surfaces of the first and second coatings from touching each other. Suitable options for this include, for example, soda soap or preferably sodium oleate or sodium salt of oleic acid because of their ease in handling—it is also conceivable to use other adhesion-disrupting release agents such as silicone, fluorine-containing (PTFE) materials, oils, and/or fats.

The reaction accelerator can, for example, contain or be a urea and/or urea derivative, a Lewis base (for example tertiary amines), a Lewis acid (for example $BF_3$), an imidazole (for example 1-methylimidazole, 2-methylimidazole, 2-ethyl-4-methylimidazole), other imidazole derivatives, imidazole adducts, modified amines, or heterocyclic amines. All of the above-mentioned substances can be contained in the reaction accelerator individually or as a mixture.

Preferably, reaction accelerators in the form of imidazoles are used as particularly effective catalysts for the polymerization of resins, for example epoxy resins.

The separating layer can be simplified from a process standpoint and embodied in a reproducible way if a liquid is applied to and dried on the first and/or second coating. For this purpose, in addition to a release agent, the liquid also contains a reaction accelerator for the adhesive of the first coating. The components of the liquid that remain behind in these conditions form the separating layer. Therefore in addition to the release agent, the separating layer at least also contains the reaction accelerator for the adhesive of the first coating.

Preferably, the liquid contains from 1 to 30 wt % release agent, from 1 to 10 wt % reaction accelerator, and optionally from 0.1 to 10 wt % co-solvent and/or from 0.1 to 10 wt % film-forming agent and residual water as well as inevitable manufacture-related impurities. It is conceivable for a co-solvent to be in the form, for example, of butyl glycol, methoxypropanol, 1-methoxypropanol, ethoxypropanol, butoxypropanol, sec. butanol, etc. It is conceivable, for example, for a film-forming agent to be an organic, for example water-based, resin. A water-based acrylate resin, alkyd resin, polyurethane, epoxy resin, phenolic resin, urea resin, and melamine resin can be suitable for this purpose.

Preferably, the liquid is heated to 20 to 80° C. during the drying, which can ensure among other things that the adhesive of the first coating is not undesirably activated as a result. Consequently, the chemical reaction (for example a cross-linking) of the adhesive is not set in motion before a baking of the stacked sheet metal parts. In this way, the reproducibility of the method is not jeopardized.

If the separating layer formed by the liquid is dried to a residual moisture of at most 5%, then this can increase the cycle speeds in the stacking of the sheet metal parts and further accelerate the method.

Preferably, the second coating has a support matrix, more particularly made of an organic resin, polyvinyl alcohol, and/or phenoxy resin.

The first coating is an epoxy resin-based coating in order to further simplify the method and improve the reproducibility of the method. Preferably, the first coating is a backlack coating. Particularly preferably, an epoxy resin-based backlack coating is used as the first coating. More particularly, a first coating of this kind can enable comparatively high adhesive forces and a particularly good electrical insulation effect between the sheet metal parts.

Preferably, the first coating is a bisphenol-based epoxy resin system with a for example dicyandiamide-based hardener. More particularly, it can be a bisphenol A-epichlorohydrin resin system with dicyandiamide as the hardener. On the electrical steel strip, this two-stage curing epoxy resin system is in the B state. Consequently, the partially cross-linked first coating is still reactive. Through the supply of heat, the first coating in the B state reacts further and can thus be converted into the fully cross-linked C state, which is also referred to as baking.

Preferably the thickness of the second coating is less than or equal to 3 µm (micrometers), 2 µm, 1 µm, or 0.5 µm in order to enable production of particularly compact lamination stacks with a comparatively high magnetic conductivity.

Preferably, the thickness of the first coating is equal to or more than 4 µm, 6 µm, 8 µm, 10 µm, 12 µm, or 15 µm.

More particularly, the electrical steel strip is prepared in the form of a coil, which among other things can facilitate the handling of the electrical steel strip in the method.

BRIEF DESCRIPTION OF THE DRAWINGS

In the figures, the subject matter of the invention is shown by way of example based on one design variant. In the drawings.

DETAILED DESCRIPTION OF THE INVENTION

Figure 1:
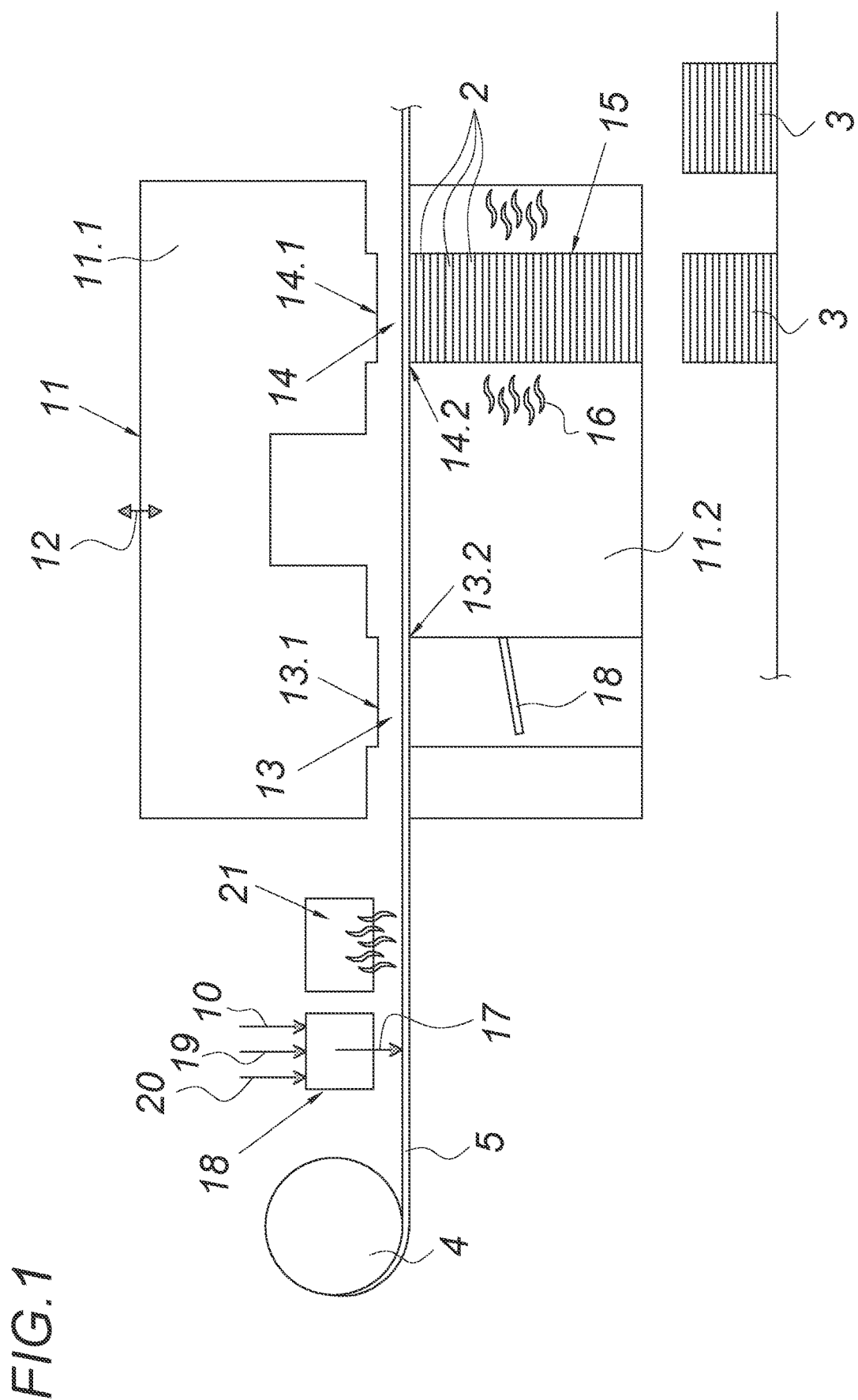
FIG. 1 shows a schematic view of a device for producing lamination stacks.

FIG. 1 schematically depicts an exemplary embodiment of a device 1 for carrying out the method according to the invention. This device 1 is used for stacking stamped-out sheet metal parts 2 in order to form lamination stacks 3.

For this purpose, an electrical steel strip 5 is unwound from a coil 4 or bundle, which electrical steel strip 5 is coated on both of its flat sides 6, 7—specifically, a first coating 8 is provided on the first flat side 6 of the electrical steel strip 5 and a second coating 9 is provided on the second flat side 7 of the electrical steel strip 5.

Instead of the electrical steel strip 5 shown in the exemplary embodiment, it is conceivable to use an electrical steel sheet.

The first 3 µm thick coating 8 consists of a thermally activatable adhesive, which is free of reaction accelerators 10. The adhesive in the exemplary embodiment is a bisphenol A-epichlorohydrin resin system with dicyandiamide as the hardener.

The second 2 µm thick coating 9 contains the reaction accelerator 10 for the adhesive of the first coating 8. This reaction accelerator 10, namely 2-ethyl-4-methylimidazole, is embedded in a support matrix made of phenoxy resin of the second coating 9. The support matrix serves as a depot for the reaction accelerator 10.

Figure 2:
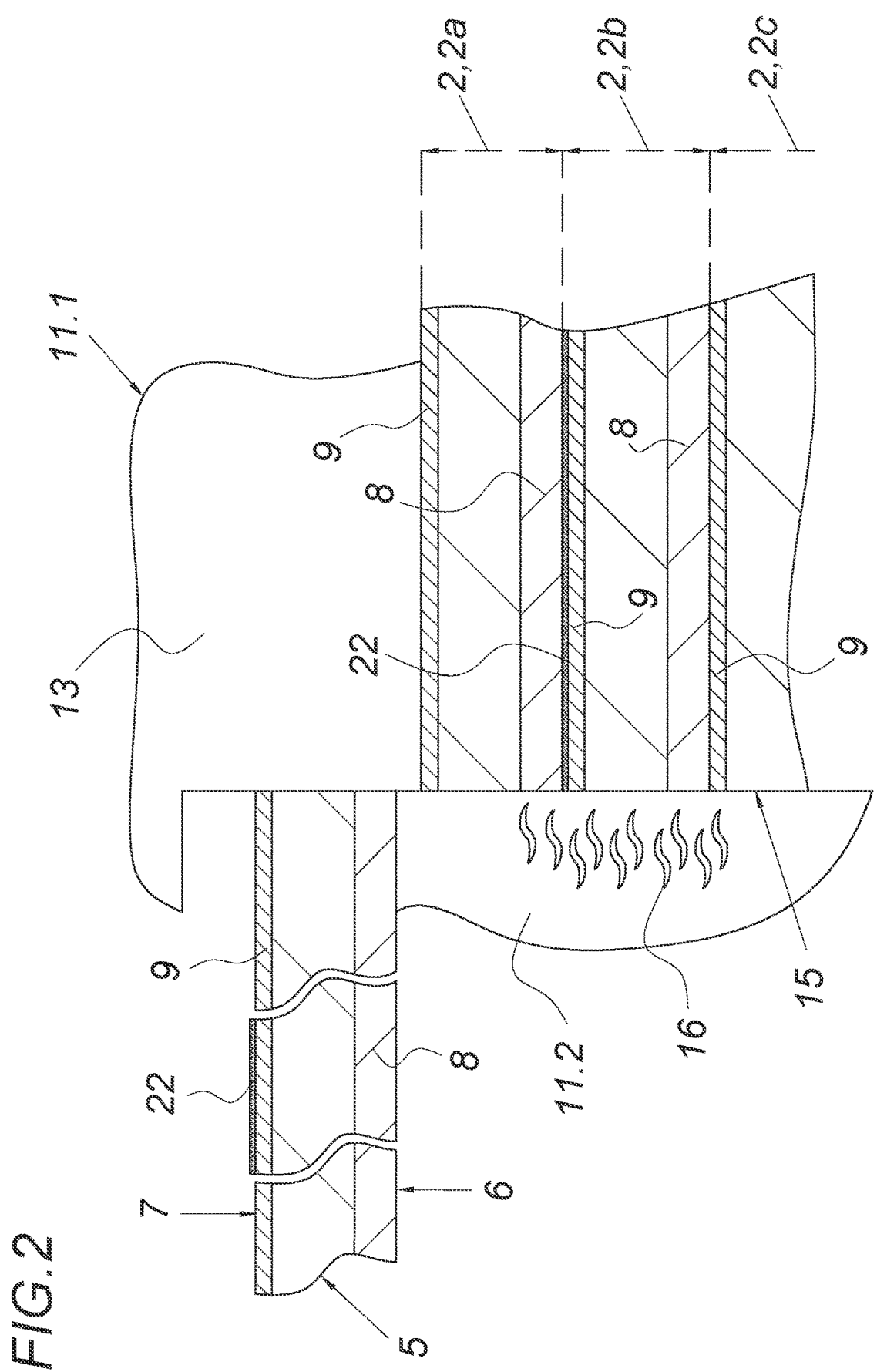
FIG. 2 shows an enlarged partial view of a final stamping stage of the device according to FIG. 1.
Figure 3:
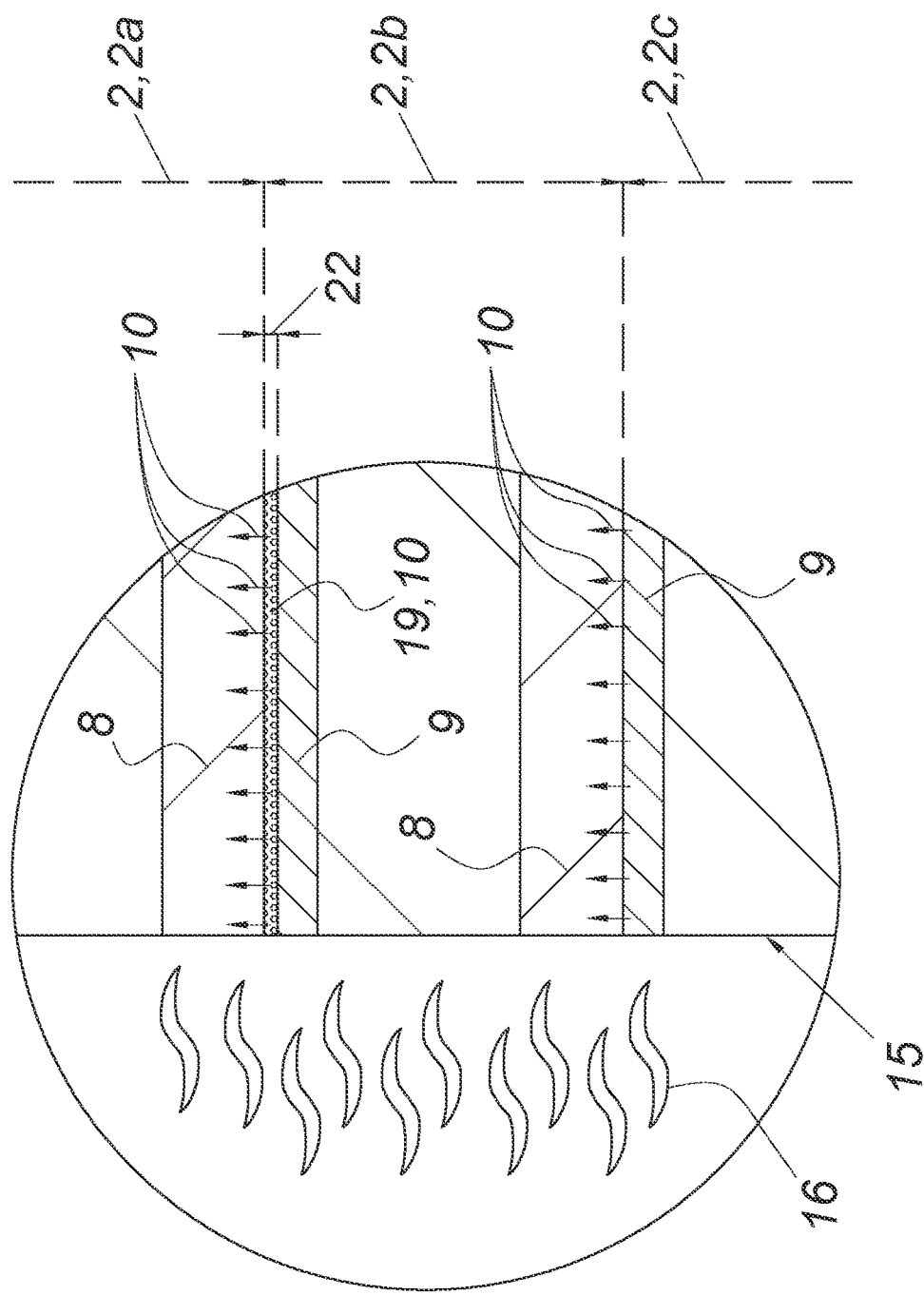
FIG. 3 shows an enlarged partial view of sheet metal parts from FIG. 2 during the baking.

These two coatings 8, 9 are visible in FIGS. 2 and 3—an electrical steel strip 5 coated in this way is known, for example, from WO2019/201788A1.

With the aid of a stamping tool 11, multiple sheet metal parts 2 are separated from the electrical steel strip 5 that is coated on both sides. Such a separating procedure can, generally speaking, be a stamping out, cutting out, cutting off, detaching, trimming, dividing by means of pressing out, etc.

As can also be inferred from FIG. 1, the stamping tool 11, for example a progressive stamping tool in this case, carries out a cutting with multiple strokes 12 in which its upper tool 11.1 cooperates with its lower tool 11.2.

Several stamping stages 13, 14 are visible in the stamping tool. With the first blade 13.1 of the first stamping stage 13, the electrical steel strip 5 is preprocessed for a separation of the sheet metal parts 2 in that for example a scrap part 18 is cut off from the electrical steel strip 5.

After this step, the second blade 14.1 of the second stamping stage 14 separates the sheet metal part 2 from the electrical steel strip 5. For this purpose, the blades 13.1, 14.1 cooperate with the respective dies 13.2, 14.2 of the stamping stages 13, 14, which are provided on the lower tool 11.2.

With the aid of the stamping stage 14, which separates the sheet metal parts 2 or in this case, cuts them off or also presses them out from the electrical steel strip 5, the sheet metal part 2 is forced by the pressure of the upper tool 11.1 into a stacking device 15 and stacked in it. Thus in each pair, the first coating 8 of one sheet metal part 2 faces the second coating 9 of another sheet metal part 2.

The stacking device 15 provided in the lower tool 11.2 has a tapering guide—which is not shown. This guide exerts the action of a stack brake on the sheet metal parts 2, which causes the sheet metal parts 2 to be stacked in the stacking device 15 under the pressure of the upper tool 11.1.

The stacking device 15 is actively heated with a heating device 16 in order to activate the adhesive and produce an integral bond between the sheet metal parts 2.

In the stacking device 15, the stacked sheet metal parts 2 are thus baked onto each other through thermal activation of the adhesive of the first coating 8. During the gluing and baking of the sheet metal parts 2, a diffusion of the reaction accelerator 10 from the second coating 9 to and/or into the adhesive of the first coating 8 takes place. The reaction accelerator 10 (or catalyst) accelerates the chemical reaction and thus the gluing and baking of the sheet metal parts 2—as shown in FIG. 3 for the sheet metal parts 2b and 2c.

It is conceivable for the lamination stacks 3 to undergo further curing steps—not shown—in order to strengthen or further cure the integral bond between the sheet metal parts 2.

The sheet metal parts 2 that are baked onto one another are divided into lamination stacks 3 after the stacking device 15.

In order to facilitate this and produce geometrically accurate lamination stacks 3 in a reproducible way, according to the invention, a liquid 17 is applied with a coverage of 2 g/m$^2$ onto the second coating 9 before the stacking of the sheet metal parts 2. For this purpose, a coating device 18 applies the liquid 17 before the stamping tool 11—specifically in a contactless fashion using a spray nozzle 18.1. In this way, a sufficient quantity of liquid 17 on the second coating 9 can be ensured, even when there are surface irregularities. Alternatively, it is also conceivable for a contacting application to be performed with a pressure stamp such as a pressure pad or felt.

It is also conceivable, however, for this liquid 17 to be alternatively or additionally applied to the first coating 8 as well, which is not shown.

The liquid 17 contains
5 wt % soda soap as a release agent 19,
2 wt % 2-ethyl-4-methylimidazole as a reaction accelerator 10,
2 wt % 1-methoxypropanol as a co-solvent,
and residual water 20 as well as inevitable manufacture-related impurities.

Then the liquid 17 is heated to 50° C. with a drying device 21 and dried among other things through an evaporation of the water, thus forming an approx. 100 nm (nanometers) thick separating layer 22 on the second coating 9; in general, it is conceivable for there to be a layer thickness of the separating layer 22 of 50 to 150 nm. This separating layer 22 contains the components of the liquid 17 such as the release agent 19, the reaction accelerator 10, and possibly the film-forming agent. The residual moisture of the separating layer 22 after the drying is 3%.

According to the invention, the release agent 19 reduces or prevents an integral bond from forming between two sheet metal parts 2 and—as shown in FIGS. 2 and 3, between the two sheet metal parts 2, 2a and 2, 2b. This effect is achieved in that the release agent 19 exerts a wetting-disrupting action on the first and second coatings 8, 9. This facilitates the division of the sheet metal parts 2 into lamination stacks 3 or more precisely stated, produces a dividing point at which the two adjacent sheet metal parts 2a, 2b cannot be baked onto one another.

The release agent 19, however, disadvantageously impedes or prevents a transfer of the reaction accelerator 10 of the second coating 9 of the sheet metal part 2, 2b into the first coating 8 of the sheet metal part 2, 2a. The first coating 8 therefore lacks a reaction accelerator 10 for achieving a quicker or complete curing.

According to the invention, this disadvantage is compensated for by the fact that the separating layer 22 contains the reaction accelerator 10. Consequently, a sufficient quantity of reaction accelerator 10 is nevertheless available for the coating 8—which ensures the curing of the adhesive of the first coating 8.

A squeezing out of the first coating 8 of the sheet metal part 2, 2a that would negatively affect the geometric accuracy can therefore be prevented during the baking of the sheet metal parts 2 in the stacking device 15. According to the invention, geometrically accurate lamination stacks 3 are produced with a higher degree of reproducibility.

The separating layer 22 consists of the release agent 19, preferably sodium oleate, the reaction accelerator 10, preferably 2-ethyl-4-methylimidazole, and possibly also the film-forming agent, for example an organic water-based resin, wherein the separating layer 22 can still contain water due to a residual moisture of at most 5%. For example because of the liquid application, the separating layer 22 can be heterogeneously embodied. In addition, its components can be homogeneously distributed.

The separating layer 22 or more precisely the liquid 17 is applied to some sections of the electrical steel strip or sheet 5 and/or the respective sheet metal part 2 in accordance with the required height of the lamination stacks 3.

The invention claimed is:

1. A method for connecting sheet metal parts in order to form lamination stacks, comprising:
preparing an electrical steel strip or sheet, which has a first coating on a first flat side and a second coating on a second flat side opposite from the first flat side, wherein the first coating contains a thermally activatable adhesive and is free of reaction accelerators, and wherein the second coating contains a reaction accelerator for the adhesive of the first coating,
separating sheet metal parts from the electrical steel strip or sheet,
stacking the separated sheet metal parts onto one another in such a way that between each pair of successive sheet metal parts, the first coating faces the second coating,
baking the stacked sheet metal parts onto one another through activation of the adhesive of the first coating and
in another step, dividing the stacked sheet metal parts into lamination stacks,
wherein the first and/or second coating is provided with a separating layer, which contains a reaction accelerator for the adhesive of the first coating and a release agent to facilitate the division of the sheet metal parts into lamination stacks.

2. The method according to claim 1, wherein the separating layer on the first and/or second coating of the electrical steel strip is provided in selected areas and/or the separating layer on the first and/or second coating of individual sheet metal parts is provided in selected areas or over an entire area before the stacking.

3. The method according to claim 1, wherein the release agent is adhesion-disrupting.

4. The method according to claim 3, wherein the release agent is a soda soap.

5. The method according to claim 1, wherein the reaction accelerator comprises at least one of the group consisting of: a urea, a urea derivative, a Lewis base, a tertiary amine, a Lewis acid, BF$_3$, an imidazole, 1-methylimidazole, 2-methylimidazole, 2-ethyl-4-methylimidazole, an imidazole derivative, an imidazole adduct, a modified amine, and a heterocyclic amine.

6. The method according to claim 1, wherein a liquid is applied to and dried on the first and/or second coating, which liquid, in addition to the release agent, also contains the reaction accelerator for the adhesive of the first coating in order to form the separating layer.

7. The method according to claim 6, comprising heating the liquid to 20 to 80° C. during the drying.

8. The method according to claim 6, wherein the separating layer formed by the liquid is dried to a residual moisture of at most 5%.

9. The method according to claim 6, wherein the liquid contains from 1 to 30 wt % release agent, from 1 to 10 wt % reaction accelerator, and optionally from 0.1 to 10 wt % co-solvent, and/or from 0.1 to 10 wt % film-forming agent, and residual water as well as inevitable manufacture-related impurities.

10. The method according to claim 9, wherein the co-solvent is 1-methoxypropanol.

11. The method according to claim 9, wherein the film-forming agent is an organic, water-based resin.

12. The method according to claim 1, wherein the second coating has a support matrix.

13. The method according to claim 12, wherein the support matrix is made of an organic resin, polyvinyl alcohol, and/or phenoxy resin.

14. The method according to claim 1, wherein the first coating is an epoxy resin-based coating and/or a backlack coating.

15. The method according to claim 14, wherein the first coating is an epoxy resin-based backlack coating.

16. The method according to claim 1, wherein a thickness of the second coating is less than or equal to 3 µm.

17. The method according to claim 1, wherein a thickness of the first coating is less than or equal to 4 µm.

18. The method according to claim 1, wherein the electrical steel strip is embodied in the form of a coil.

19. The method according to claim 1, comprising separating the sheet metal parts from the electrical steel strip or sheet by cutting the sheet metal parts from the electrical steel strip or sheet.

* * * * *

UNITED STATES PATENT AND TRADEMARK OFFICE
CERTIFICATE OF CORRECTION

PATENT NO. : 12,319,043 B2
APPLICATION NO. : 18/252689
DATED : June 3, 2025
INVENTOR(S) : Ronald Fluch Page 1 of 1

It is certified that error appears in the above-identified patent and that said Letters Patent is hereby corrected as shown below:

In the Claims

Column 8 Claim 17, Line 2: please delete "greater than" and insert -- less than --.

Signed and Sealed this
Fifteenth Day of July, 2025

Coke Morgan Stewart
*Acting Director of the United States Patent and Trademark Office*